3,004,896
ULTRA-VIOLET LIGHT-ABSORBING
COMPOSITION OF MATTER
Hansjorg Heller, Basel, Ernst Keller, Binningen, Basel-Land, and Hermann Gysling, Riehen, near Basel, Switzerland, and Fritz Mindermann, Grenzach, Baden, Germany, assignors to J. R. Geigy A.-G., Basel, Switzerland
No Drawing. Filed Dec. 10, 1957, Ser. No. 701,719
Claims priority, application Switzerland Dec. 14, 1956
8 Claims. (Cl. 167—90)

Many synthetic materials used in technics as well as also some substances of biological importance such as, certain foodstuffs for example, are disadvantageously altered by the effect of light. It is known that this is due to a considerable extent to the ultra-violet rays.

The present invention is concerned with non-actinic agents characterised by a content of certain 2-aryl-4.5-arylo-1.2.3-triazole compounds, which agents are distinguished by a very slight absorption in visible light and very high fastness to light in the substrata. The invention also concerns processes for the protection of substances which are sensitive to light from the injurious effect of the ultra-violet rays by incorporating therein certain 2-aryl-4.5-arylo-1.2.3-triazole compounds or by covering them with foil-like substances or protective coverings which contain these triazole compounds. The invention also concerns, as industrial product, the substances which are sensitive to light which are protected from injury by light by the use of the triazole compounds named.

It has been found that organic compounds of the formula:

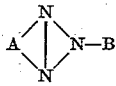

are effective non-actinic agents. In this formula the triazole ring is written in the conventional manner but the arrangement of valences at the nitrogen atom is left undetermined. In this formula:

A represents a phenylene radical bound by two neighbouring carbon atoms to two nitrogen atoms of the triazole ring, and
B represents a phenyl radical, substituted by groups not imparting strong colouration.

In order to obtain absorption of the longest ultra-violet waves possible as well as to attain a particularly high grade of fastness to light, it is advantageous if B represents a phenyl radical having a free hydroxyl group in the 2-position with regard to the linkage with the triazole ring and which can be further substituted in other positions as defined, in particular by lower alkyl, lower alkoxy, lower carbalkoxy, cyclohexyl, phenyl groups and halogen. Compounds containing such substituents in the 5-position are advantageous.

Particularly valuable sub-classes of non-actinic agents according to the present invention (actively UV-absorbing compounds) are compounds having a free hydroxyl group in the 2-position with regard to the linkage with the triazole ring and which are substituted in the 3- and 5- or in the 4- and 5-positions by lower alkyl and chlorine.

In order to attain the absorption necessary for cosmetic purposes (absorption of UV rays up to 320 mµ causing erythema but non-absorption of sun-tanning rays about 350 mµ, it is particularly advantageous if B represents a phenyl radical having in the 0-position a substituent R (R being an alkyl, aralkyl, aryl, acyloxy, alkoxy or aralkoxy radical, preferably lower alkyl, lower alkoxy and acyloxy radicals). This phenyl radical can also be substituted in further positions as defined, in particular by hydrocarbon radicals such as, e.g. lower alkyl, hydroxyl groups or halogen.

In particular compounds which contain a lower alkoxy or acyloxy or a lower alkyl group in the 2-position with regard to the linkage with the triazole ring or which contain hydrogen, chlorine or lower alkyl in the 5-position or an OH group in the 4-position, both with regard to the linkage to the triazole ring, are of particular interest.

Halogens such as, e.g. fluorine, chlorine, bromine; alkyl groups such as methyl, ethyl, butyl, amyl, octyl, dodecyl groups; substituted alkyl groups such as the trifluoromethyl group; alicyclic groups such as the cyclohexyl group, methyl cyclohexyl groups or such as the 1.2-polymethylene groups, e.g. the α.β-tetramethylene group; aralkyl groups such as the benzyl group, alkyl or alkoxy or halogen benzyl groups; aryl groups such as phenyl or alkoxyphenyl groups; R—O—groups wherein R represents hydrogen, an alkyl radical, aralkyl radical such as benzyl, an aryl radical such as phenyl, chlorophenyl or alkylphenyl radical; carbacyl groups such as an alkyl carbonyl, arylcarbonyl or alkoxycarbonyl radical, R—CO—groups wherein R represents hydrogen, an alkyl radical, an aralkyl radical such as benzyl, an aryl radical such as phenyl or chlorophenyl radical; a hydroxyl group, an alkoxy or an aryloxy group, an amino radical, an organically substituted amino radical, e.g. a monoalkyl, monocycloalkyl, monoaralkyl or monophenylamino group, a dialkylamino group, dicycloalkylamino group, diaralkylamino group, alkylaralkylamino group or alkylphenylamino group; R—SO$_2$ groups in which R represents a hydroxyl group, an alkyl radical, aralkyl radical such as benzyl, aryl radical such as phenyl, alkyl phenyl or alkoxy phenyl radical, an amino group such as H$_2$N-, an organically substituted amino group such as, e.g. a monoalkyl, monocycloalkyl, monoaralkyl, monophenyl, dialkylamino group, diaralkyl amino groups such as dibenzyl amino group, dicycloalkyl amino groups such as dicyclohexylamino group, alkylaralkyl amino groups such as alkylbenzyl amino groups and an alkyl-aryl amino group such as alkylphenyl amino groups, can be used as substituents of the aromatic rings, in particular of the radicals A and B.

All these groups are bound to the rings A and B by carbon, oxygen or sulphur atoms. If aromatic radicals are substituents or are in substituents, they can be substituted as A or B. Aromatic radicals should be bound to A or B either direct as in diphenyl derivatives or by means of saturated divalent bridging members not having dyeing characteristics. Examples of such bridging members are saturated hydrocarbon radicals, oxygen or sulphur ether atoms, carbonyl, sulphoxide, sulphonyl, di-sulphimide, carboxyl-sulphimide groups.

The compounds according to the present invention are produced by coupling aryldiazonium compounds with azo components of the benzene and naphthalene series coupling in the o-position to a primary amino group, which azo components may also be further substituted as defined, and oxidizing the o-aminoazo dyestuffs thus formed to the corresponding 1.2.3-triazole compound. They can also be produced by coupling o-nitro aryl diazonium compounds of the benzene or naphthalene series with phenols or naphthols coupling in the o- or p-positions or with amines of the benzene and naphthalene series coupling in the p-positions to a primary amino group, and then reducing the o-nitro-azo dyestuffs by the usual methods, e.g. with ammonium sulphide or with zinc in an alkaline medium to form the 1.2.3-triazole compounds. In these processes also the aromatic rings can be further substituted as defined. In the end product free hydroxyl groups can also be alkylated or acylated. Primary amino groups must be removed by diazotizing them and replacing the diazo group, by the usual methods, by for example, hydrogen, halogen or cyano or hydroxyl groups.

The triazole compounds according to the present invention are incorporated into the material to be protected from UV rays or into the protective foils and coverings in amounts varying from fractions of percentages to several percent. The protected material or protective coverings can contain, for example 0.001% to 15% of the active ingredient and should contain, advantageously 0.01% to 5.0%. In non-actinic agents for the human skin, the content of active ingredient should be, advantageously 0.1–10% calculated on the non-volatile components of the preparation.

Examples of substances which can be protected from the injurious effect of light according to the present invention are polymers produced either by addition or condensation polymerisation or by both methods either simultaneously or the one following the other such as for example, polyester resins, polyesters such as, e.g. the terephthalic acid esters of polyalcohols such as glycol, dihydroxyethyl sulphide, bis - p-(hydroxy-ethoxyphenyl)-alkanes, polyamides such as superpolyamides and superpolyurethanes, chlorine-containing vinyl polymers, cellulose esters and ethers, polyhydrocarbons such as polyethylene, polystyrene, polymers such as are obtained from drying oils such as, e.g. linseed oil, also wood, living skin, particularly human, fat and oils, cosmetic preparations, foodstuffs such as butter, photographic materials and many others. These substances can be in the usual marketed forms, for example fibres, films, lacquers, plates etc.; they can be dyed or pigmented.

It is known that of substances suggested as non-actinic agents in the literature, only the o-hydroxybenzophenones have been used to a certain extent in technics because their properties more or less meet the very high requirements. In the same technical application, the triazole compounds used according to the present invention have the following advantages over the known products: having similar fastness to light, their absorption of the ultra-violet light is much stronger or, having similar absorption of UV-light, they are much more fast to light.

By a suitable choice of substituents, compounds can also be found amongst the non-actinic agents according to the present invention which can be used as skin-protecting agents. They prevent erythema occurring but do not prevent tanning.

The favorable effects according to the present invention are astonishing in view of the fact that the fastness to light of the [4.5-arylo-1.2.3-triazinyl] compounds of the stilbene and p-phenylene series which have a strong fluorescence in daylight and up to now have been used as optical brightening agents in the textile industry is one order of magnitude lower. These compounds are therefore less suitable as non-actinic agents for technical purposes.

In this description the expressions "non-actinic compounds" and "UV-absorbing compounds" are regarded as equivalent.

The following examples illustrate the suitability of the triazole compounds used according to the present invention as non-actinic agents. Parts are given as parts by weight and the temperatures are in degrees centigrade.

EXAMPLE 1

Cellulose acetate foils are produced by dissolving 15.0 parts of acetyl cellulose (2.5 of the 3 OH groups per glucose unit esterified with acetic acid), 0.3 part of one of the non-actinic agents given in the following Tables 1a and 1b and 2.0 parts of dibutyl phthalate in 82.7 parts of acetone and drawing a film from this solution on to glass. The foils which are first dried at room temperature and then in the oven at 60° are 0.04 mm. thick. Samples thereof are exposed to light for 1000 hours in the fadeometer and then tested for brittleness by folding. The results are summarised in the following table:

Table 1a

| No. | Non-actinic agent | Behaviour of foil on folding before exposure | after exposure for 1,000 hours |
|---|---|---|---|
| I | 2-(2'-hydroxy-5'-methylphenyl)-benztriazole. | Unchanged | Unchanged. |
| II | 2-(2'-hydroxy-5'-methylphenyl)-benztriazole-5-carboxylic acid butyl ester. | do | Do. |
| III | 2-(2'-hydroxy-5'-tert.butylphenyl)-5-chlorobenztriazole. | do | Do. |
| IV | 2-(2'-hydroxy-5'-amylphenyl)-benztriazole. | do | Do. |
| V | 2-(2'-hydroxy-5'-tert.butylphenyl)-benztriazole. | do | Do. |
| 0 | Blind test without nonactinic agent. | do | Split. |

The reason for the activity of the triazole compounds claimed according to the present invention probably lies in their capability to absorb ultra-violet light, as can be seen from the following:

The ultra-violet transmission is determined with light of 350–380 mµ. This transmission is measured in percent in the following Table 1b:

Table 1b

| No. | Non-actinic agent | Percent transmission in light of 350-380 mµ | |
|---|---|---|---|
| | | Unexposed | After 1,000 hours |
| I | 2-(2'-hydroxy-5'-methylphenyl)-benztriazole. | About 1 | About 1. |
| II | 2-(2'-hydroxy-5'-methylphenyl)-benatriazole-5-carboxylic acid butyl ester. | do | Do. |
| III | 2-(2'-hydroxy-5'-tert.butylphenyl)-5-chlorobenztriazole. | do | Do. |
| IV | 2-(2'-hydroxy-5'-amylphenyl)-benztriazole. | do | Do. |
| V | 2-(2'-hydroxy-5'-tert.butylphenyl)-benztriazole. | do | Do. |
| VI | Resbenzophenone (2.4-dihydroxybenzophenone). | 23 | 35. |
| 0 | Blind test | 97 | 97. |

Table 1b shows that the triazole compounds used according to the present invention more completely absorb the ultra-violet rays also after longer exposure than Resbonzophenone, a light stabilizer much used in technics. They are considerably more fast to light.

EXAMPLE 2

Nylon fabrics are protected from the injurious effect of light by packing in transparent foils which contain one of the non-actinic agents named in Table 2. Foils containing compounds I and II given in Table 1a which are obtained according to Example 1 have the following protective action after exposure to daylight for 3 months:

Table 2

| Foils | Tensile strength of the weft in g./den. |
|---|---|
| Without non-actinic agent | 0.48 |
| Non-actinic agent I (of Table 1a) | 1.01 |
| Non-actinic agent II (of table 1a) | 2.46 |

Similar results are obtained if foils of 0.016 mm. thickness containing 5% of non-actinic agent are used.

EXAMPLE 3

Foils are produced as in Example 1 but instead of acetyl cellulose, a cellulose ester containing 0.5 benzoyl groups and 2.1 acetyl groups per glucose unit is used.

The foils were tested for folding and transmission of UV light and the results given in the following table were obtained:

Table 3

| No. | Non-actinic agent | Behaviour of film on folding | | Percent transmission with light of 350-380 mμ | |
| --- | --- | --- | --- | --- | --- |
| | | Before exposure | After 1,000 hours exposure | Before exposure | After 1,000 hours exposure |
| I | 2-(2'-hydroxy-3'.5'-di-methyl-phenyl)-benztriazole | Unchanged | Unchanged | About 1 | About 1. |
| II | 2-(2'-hydroxy-3'.5'-di-methyl-phenyl)-5-methoxy-benztriazole | do | do | do | Do. |
| III | 2-(2'-hydroxy-3'.5'-di-methyl-phenyl)-5-methyl-benztriazole | do | do | do | Do. |
| IV | 2-(2'-hydroxy-5'-carbethoxy-phenyl)-benztriazole | do | do | 35 | 39. |
| 0 | Blind test | do | Split | 98 | 97. |

The table shows that the UV part of the light is absorbed practically unchanged by the triazole compounds used according to the present invention, also after longer exposure.

Similar results are obtained with foils of 0.5 mm. thickness and a content of 0.02% of non-actinic agent.

EXAMPLE 4

The usual marketed polyester (IC.-312, Standard Polyester of the Interchemical Corporation, New York) such as is used for the production of polyester resin plates and which does not contain a light stabilizer is polymerized, after incorporation of 0.1% of the non-actinic agents according to the present invention given below, the polymerization being performed at a raised temperature with the help of 1% of benzoyl peroxide, into 4 mm. thick, optically clear plates. Samples of the plates are exposed for 1000 hours in the fadeometer, after which time the light transmittancy is determined. Table 4 shows the results obtained:

Table 4

| No. | Non-actinic agent | Percent transmission with light of 440 mμ. | |
| --- | --- | --- | --- |
| | | Before exposure | After 1,000 hours exposure |
| I | Without non-actinic agent | 84 | 69 |
| II | 2-(2'-hydroxy-5'-methyl-phenyl)-benztriazole. | 84 | 80 |
| III | 2-(2'-hydroxy-5'-tert.butyl-phenyl)-benztriazole. | 84 | 79 |
| IV | 2-(2'-hydroxy-5'-tert.butyl-phenyl)-5-chlorobenztriazole. | 86 | 84 |
| V | 2-(2'-hydroxy-3'-methyl-5'-tert.butyl-phenyl)-benztriazole. | 85 | 82 |

Instead of the compounds given in Table 4, also the following substances can be used with similar results. They are distinguished by the wave length of the absorption maximum having the longest wave length. The spectrum is taken in methyl alcohol:

Mμ
1. 2-(2'-hydroxy-5'-methoxy-phenyl)-benztriazole __ 350
2. 2-(2'-hydroxy-5'-methyl-phenyl)-5.6-dichlorobenztriazole _____ 342
3. 2-(2'-hydroxy-5'-phenyl-phenyl)-5-chlorobenztriazole _____ 342
4. 2-(2'-hydroxy-5'-cyclohexyl-phenyl)-5-chlorobenztriazole _____ 341
5. 2-(2'-hydroxy-5'-cyclohexyl-phenyl)-benztriazole 338
6. 2-(2'-hydroxy-4'.5'-dimethyl-phenyl)-benztriazole-5-carboxylic acid butyl ester _____ 347
7. 2-(2'-hydroxy-3'.5'-dichlorophenyl)-benztriazole 335
8. 2-(2'-hydroxy-4'.5'-dichlorophenyl)-benztriazole 334
9. 2-(2'-hydroxy-5'-methyl-phenyl)-benztriazole-5-ethyl-sulphone _____ 350
10. 2-(2'-hydroxy-3'.5'-dimethyl-phenyl)-benztriazole-5-ethyl-sulphone _____ 351
11. 2-(2'-hydroxy-5'-phenyl-phenyl)-benztriazole __ 340
12. 2-(2'-hydroxy-5'-methoxy-phenyl)-5-methyl-benztriazole _____ 350

If 0.01% of non-actinic agent No. IV of Table 4 is used, then after 1000 h. exposure, the transmission 76; with a content of 0.5% however, it is 83. Thus both concentrations have a protective action.

EXAMPLE 5

0.1 part of the non-actinic agents given below are added to 100 parts of marketed polyester resin containing chlorendic acid (Hetron resin No. 92, Hooker Electro Chem. Co. New York) and, after addition of the usual peroxides (for example 1% of benzoyl peroxide) the whole is polymerized to optically clear plates. After exposing for 500 hours in the fadeometer, the light transmittancy was determined and the following results were obtained.

Table 5

| No. | Non-actinic agent | Percent transmission with light of 440 mμ | |
| --- | --- | --- | --- |
| | | Before exposure | After 500 hours exposure |
| 0 | Blind test | 80 | 11 |
| I | 2-(2'-hydroxy-5'-methyl-phenyl)-benztriazole. | 79 | 40 |
| II | 2-(2'-hydroxy-5'-amyl-phenyl)-benztriazole. | 78 | 52 |
| III | 2-(2'-hydroxy-5'-methyl-phenyl)-benztriazole-5-carboxylic acid butyl ester. | 79 | 60 |

If instead of 0.1%, 0.5% of the additive III of Table 5 are used, then on exposure for 500 hours the transmission drops from 75% to 50%. The non-actinic agents listed in example 4 can be used with similar results.

EXAMPLE 6

Polyester resin plates are produced as described in example 4 but glass fibres are also mixed into the liquid mixture. After polymerization, the transparent, very strong plates obtained were exposed for 500 hours in a fadeometer whereupon the following results were obtained:

*Table 6*

| No. | Non-actinic agent | Glass fibres | | |
|---|---|---|---|---|
| | | 10% | 20% | 30% |
| I | 2-(2'- hydroxy - 5'- tert.butyl - phenyl)-5-chlorobenztriazole. | 1–2 | 1–2 | 2 |
| II | 2-(2'-hydroxy-5'-methyl-phenyl)-benztriazole. | 2 | 2–3 | 2–3 |
| 0 | Blind test | 4 | 4 | 4 |

Evaluation:
1=unchanged.
2=yellowish appearance just apparent.
3=clearly yellowish.
4=strongly yellow-brown coloured.

EXAMPLE 7

Non-combustible polyester resin plates containing glass fibres were produced as described in example 6. 2-(2-hydroxy-5'-tert. butyl-phenyl)-5-chlorobenztriazole was used as non-actinic agent and, on exposing all the plates as in example 6, the results given in Table 7 were obtained:

*Table 7*

| Content of non-actinic agent, percent | Content of glass fibres | |
|---|---|---|
| | 10% | 25% |
| 0.00 | 4 | 4 |
| 0.02 | 3 | 3 |
| 0.04 | 2–3 | 2–3 |
| 0.06 | 2–3 | 2–3 |
| 0.08 | 2 | 2–3 |
| 0.10 | 2 | 2 |
| 0.20 | 1–2 | 2 |
| 0.50 | 1 | 1–2 |

The evaluation is the same as that given in Table 6.

EXAMPLE 8

100 parts of methacrylic acid methyl ester, 0.2 part of non-actinic agent and 0.2 part of lauroyl peroxide are mixed and polymerised into forms at a temperature of 50–70° within 24 hours. After exposure for 1000 hours in the fadeometer, the light transmission of the plates obtained was measured:

*Table 8*

| No. | Non-actinic agent | Percent transmission with light of— | |
|---|---|---|---|
| | | 380 mμ | 450 mμ |
| I | 2 - (2'- hydroxy - 5'- methyl - phenyl)-benztriazole. | 2 | 92 |
| II | 2-(2'-hydroxy-3'.5'-dimethyl-phenyl)-benztriazole. | 1 | 92 |
| 0 | Blind test | 90 | 92 |

As can be seen, the high UV absorption power of such plates claimed according to the present invention is retained even after long exposure and the glass-clear plates do not become yellow colored. They can be used, therefore, as colorless, light stable UV filters.

Similar results are obtained if 0.5% of non-actinic agent are used. In order to obtain similar results with a content of non-actinic agent of 0.02% the plates must be made 1 cm. thick.

EXAMPLE 9

Foils from a mixture consisting of:

66 parts of polyvinyl chloride pulverised,
33 parts of dioctyl phthalate
1 part of non-actinic agent are produced on a roller frame at 150°. Samples of these foils are exposed for 720 hours in the fadeometer. The results given in Table 9 are obtained:

*Table 9*

| No. | Non-actinic agent | Appearance of the foils after exposure |
|---|---|---|
| 0 | Blind Test | Decomposed. |
| I | 2 - (2'-hydroxy-5'-methyl-phenyl)-benztriazole. | A few brown spots. |
| II | 2 - (2'-hydroxy-5'-methyl-phenyl)-benztriazole-5-carboxylic acid hexyl ester. | Unchanged. |
| III | 2 - (2'- hydroxy - 5'- tert.butyl - phenyl)-benztriazole. | A few brown spots. |
| IV | 2 - (2'- hydroxy - 5'- tert.butyl-phenyl)-5-chlorobenztriazole. | Unchanged. |

EXAMPLE 10

Foils are produced as described in Example 9 but with the addition of varying amounts of dibutyl tin dilaurate (DBT DL) and non-actinic agent. They are heated at 180° for 30 minutes and also exposed for 1300 hours in the fadeometer. Table 10 shows the results obtained using 2 - (2'-hydroxy-5'-methyl-phenyl) - benztriazole as non-actinic agent.

*Table 10*

| Non-actinic agent in percent | DBT DL, percent | Heat test, 30 min.—180° | Exposure test (1,300 hours) visual evaluation | UV absorption in percent |
|---|---|---|---|---|
| — | — | 2 | Foil decomposed | 3 |
| — | 2.0 | 4–5 | Foil unchanged | 4 |
| 0.2 | 1.8 | 4–5 | do | 94 |
| 0.6 | 1.4 | 4 | do | 97 |
| 0.8 | 1.2 | 4 | do | 98 |
| 1.0 | 1.0 | 4 | do | 98 |
| 1.2 | 0.8 | 4 | do | 98 |
| 1.4 | 0.6 | 4 | do | 98 |
| 1.8 | 0.2 | 2–3 | Few brown spots | 99 |
| 2.0 | — | 2 | Foil brittle, brown spots. | 99 |

The evaluation of the heat test is as follows:
1=complete decomposition of the foil.
2=complete dark colouring of the foil.
3=strong brown colouring of the foil.
4=clear yellow colouring of the foil.
5=no change in the foil.

The figures given in Table 10 show that although PVO foils containing the usual marketed heat and light stabilizer dibutyl tin dilaurate are stable, they still transmit the UV light. By the addition of 0.1 to 2.0% of a benztriazole non-actinic agent, a composition is attained which fulfills all stability requirements, is colorless and, in addition does not transmit UV light. As can be seen from the Table 10, a part of the heat stabilizer can be replaced by the benztriazole derivatives described.

Similar results are attained with other usual marketed heat stabilizers, for example cadmium compounds among many others, and 0.02 to 5% of benztriazole non-actinic agent.

EXAMPLE 11

1 part of 2-(2'-hydroxy-5'-methyl-phenyl)-benztriazole is dissolved at about 70° in a mixture of 100 parts of caprolactam, 10 parts of water, 0.5 part of sebacic acid and 0.3 part of $TiO_2$.

Polymerization is performed by keeping the mixture in an autoclave in the absence of oxygen for 5 hours at 250–255° and distilling off all water from the reaction mixture in the last 4 hours. The polymer obtained melts at about 215° and can be used in the usual extruders suitable for working up polyamides into forms and foils. Ultra-violet light does not penetrate the material. 0.01 to 2% of benztriazole derivative can be used depending on the thickness of the polyamide form.

If, in the above example, instead of 2-(2'-hydroxy-5'-methyl-phenyl)-benztriazole, 2 - (2' - hydroxy - 3'.5' - dimethyl - phenyl) - benztriazole or 2-(2'-hydroxy-5'-tert.

butyl-phenyl)-5-chlorobenztriazole is used, then the same effect is obtained.

EXAMPLE 12

100 parts of granulated nylon 66 and 1 part of 2-(2'-hydroxy-5'-tert. butyl-phenyl)-benztriazole or 2-(2'-hydroxy-3'.5'-dimethyl-phenyl)-5 - methyl - benztriazole are melted together at 280° in an autoclave fitted with a stirrer while excluding oxygen.

Even in a thin layer, the material obtained absorbs ultra-violet light and can be used for the production of UV foils.

From 0.01 to 2% of benztriazole compound can be used depending on the thickness of the nylon foils or plates produced.

EXAMPLE 13

100 parts of granulated polyethylene (Lupolen H of the Badische Anilin & Soda Fabrik, Ludwigshaven) are mixed in a roller vat with 0.2 part of the compounds mentioned in Table 11 and this mixture is worked up in an extruder at 130–140° into foils. After exposure (500 hours in the fadeometer) the UV absorption of the colorless foils is determined by measuring the extinction of fluorescence caused by UV light of a technical brightening agent (Tinopal SP of J. R. Geigy A.-G., Basel). The results are given in Table 11.

Table 11

| No. | Non-actinic agent | Extinction of fluorescence, percent |
|---|---|---|
| 0 | Blind test | 3 |
| I | 2-(2'-hydroxy-5'-tert.butyl-phenyl)-5-chloro-benztriazole. | 100 |
| II | 2-(2'-hydroxy-5'-amyl-phenyl)-benztriazole | 99 |

The amount of additive to attain a determined degree of extinction of UV light depends on the thickness of the polyethylene foils used. It has been found that to attain a 98% extinction of the fluorescence caused by UV light, the following amounts of compound II in Table 11 are necessary:

For foils of 0.07 mm. thickness, 1.0% of compound II
For foils of 0.5 mm. thickness, 0.1% of compound II
For foils of 5.0 mm. thickness, 0.01% of compound II.

Such polyethylene foils are suitable therefore for packing materials which are sensitive to UV light as, has been shown, even after longer exposure they absorb practically all UV light and are themselves colorless.

EXAMPLE 14

A non-actinic preparation for the human skin which prevents erythema but allows tanning is obtained as follows:

5 parts of white ceresin wax
22 parts of white petrolatum
19.5 parts of white mineral oil
15 parts of lanoline, anhydrous
2 parts of a compound named in Table 12
36 parts of water and
0.5 part of perfume The non-actinic preparation is produced by first melting the ceresin, petrolatum and the lanolin together and dispersing one of the benztriazole derivatives mentioned in the following Table 12 in the melt. Mineral oil is then added at 70° and water is then slowly introduced at the same temperature. Stirring is continued until the temperature has dropped to 50° whereupon the perfume is added.

The amounts of 0.1 to 7 parts of non-actinic agent can be used in the composition depending entirely on the intended use, for example at high altitudes, on the beach etc.

Table 12

| No. | Non-actinic agent | Maximum of absorption band having longest wavelength at mμ |
|---|---|---|
| 1 | 2-(2'-acetoxy-5-methyl-phenyl)-5-methylbenz-triazole. | 304 |
| 2 | 2-(2'-acetoxy-5'-methyl-phenyl)-benztriazole | 300 |
| 3 | 2-(2'-stearoyloxy-5'-methyl-phenyl)-benztriazole | 300 |
| 4 | 2-(2'-benzoyloxy-5'-methyl-phenyl)-benztriazole | 300 |
| 5 | 2-(2'-p-tosyloxy-5'-methyl-phenyl)-benztriazole | 298 |
| 6 | 2-(2'-methyl-4'-hydroxy-phenyl)-benztriazole | 294 |
| 7 | 2-(2'-methoxy-5'-methyl-phenyl)-benztriazole | 289 |
| 8 | 2-(2'-methoxy-5'-chloro-phenyl)-benztriazole | 288 |

EXAMPLE 15

A non-actinic preparation for the human skin which can be sprayed is obtained if 10 parts of ricinoleic acid methyl ester, 10 parts of oleyl alcohol and 1 part of 2-(2'.6'-dimethyl-4'-hydroxy-phenyl)-bentriazole are dissolved in 80 parts of ethanol. After the addition of the usual marketed Freon propellants, the solution can be sprayed from an aerosol. It protects the skin from erythema without preventing tanning by the sun.

Instead of the compound named above, also the substances mentioned in Table 12 can be used in amounts varying from 0.1 to 5 parts depending on the intended use of the preparation.

What we claim is:
1. An ultraviolet light absorbing composition consisting essentially of a substantially colorless organic carrier, said carrier consisting essentially of a member selected from the group consisting of polyesters, polyester resins, polyamides, vinyl polymers, cellulose ethers, cellulose esters and polyhydrocarbons and having uniformly dispersed therein 0.01 to 10% of an actively UV absorbing compound of the formula:

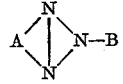

wherein A represents an o-phenylene radical bound by two neighbouring carbon atoms to two nitrogen atoms of the triazole ring, and B represents a phenyl radical which contains in 2-position an OH group and in further positions a member selected from the group consisting of H, lower alkyl, lower alkoxy, lower carbalkoxy, cyclohexyl, phenyl and halogen.

2. An ultra-violet light-absorbing composition consisting essentially of a substantially colorless organic light-transmitting cosmetic carrier selected from the group consisting of ointments and sprays having uniformly dispersed therein 0.1–10 percent of an actively UV absorbing compound of the formula:

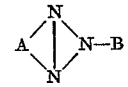

wherein A represents an o-phenylene radical bound by two neighbouring carbon atoms to two nitrogen atoms of the triazole ring, and B represents a phenyl radical which contains in 2-position a member selected from the group consisting of lower alkyl, lower alkoxy and acyloxy and in further positions a member selected from the group consisting of H, OH, lower alkyl and halogen.

An ultra-violet light-absorbing composition consisting essentially of a substantially colorless organic light-transmitting cosmetic carrier selected from the group consisting of ointments and sprays having uniformly dispersed therein 0.1–10 percent of an actively UV absorbing compound of the formula:

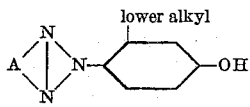

wherein A represents an o-phenylene radical bound by two neighbouring carbon atoms to two nitrogen atoms of the triazole ring.

4. An ultraviolet light absorbing composition consisting essentially of a polyester resin having uniformly dispersed therein 0.01 to 10% of 2-(2-hydroxy-5'-methyl-phenyl)-benztriazole.

5. An ultraviolet light absorbing composition consisting essentially of a polyvinyl chloride having uniformly dispersed therein 0.01 to 10% of 2-(2'-hydroxy-5'-methyl-phenyl)-benztriazole.

6. An ultraviolet light absorbing composition consisting essentially of a polyester resin having uniformly dispersed therein 0.01 to 10% of 2-(2'-hydroxy-5'-tert. butyl-phenyl)-5-chloro-benztriazole.

7. An ultraviolet light absorbing composition consisting essentially of a polyvinyl chloride having uniformly dispersed therein 0.01 to 10% of 2-(2'-hydroxy-5'tert. butyl-phenyl)-5-chloro-benztriazole.

8. An ultraviolet light absorbing composition consisting essentially of polyethylene having uniformly dispersed therein 0.01 to 10% of 2-(2'-hydroxy-5'-tert. butyl-phenyl)-bentriazole.

References Cited in the file of this patent

UNITED STATES PATENTS

| | | |
|---|---|---|
| 1,975,383 | Zitscher | Oct. 2, 1934 |
| 2,198,300 | Benhote | Apr. 23, 1940 |
| 2,362,988 | Conzetti | Nov. 21, 1944 |
| 2,412,767 | Conzetti | Dec. 17, 1946 |
| 2,713,054 | Baum | July 12, 1955 |
| 2,713,055 | Baum | July 12, 1955 |
| 2,713,056 | Sartori | July 12, 1955 |
| 2,784,184 | Zweidler et al. | Mar. 5, 1957 |